July 11, 1972    R. RICHTERICH    3,676,080
DEVICE FOR AUTOMATICALLY ANALYZING LIQUIDS
Filed Dec. 5, 1968    2 Sheets-Sheet 1
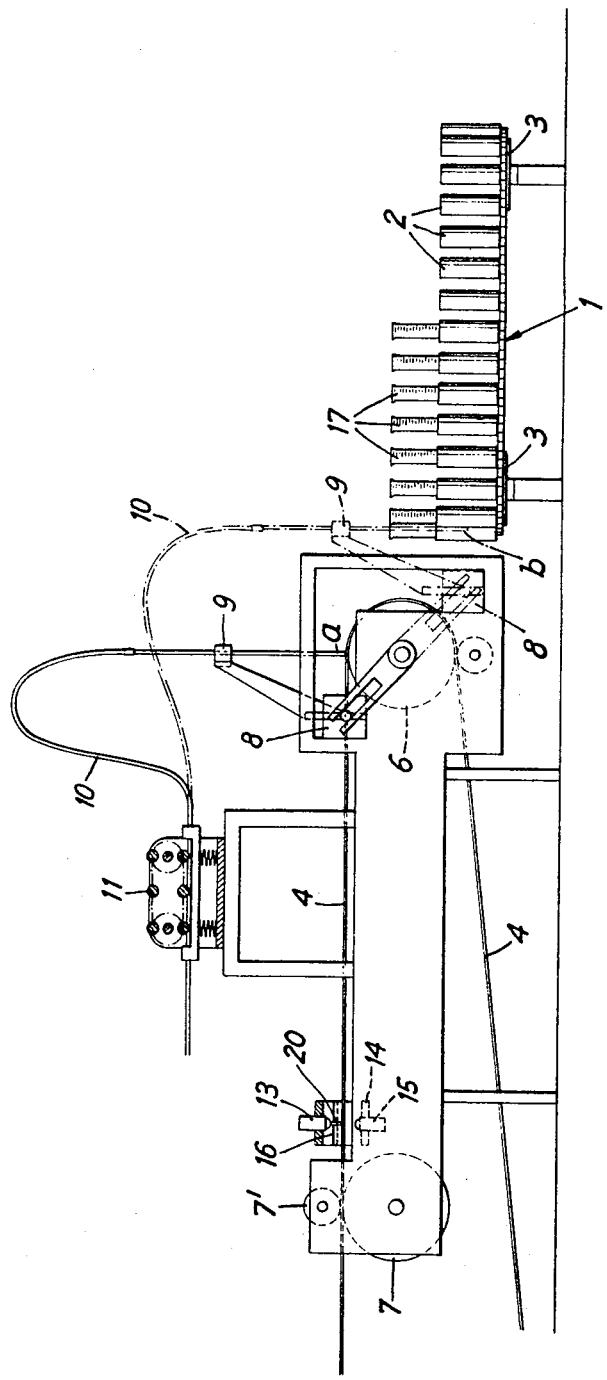

July 11, 1972  R. RICHTERICH  3,676,080
DEVICE FOR AUTOMATICALLY ANALYZING LIQUIDS
Filed Dec. 5, 1968  2 Sheets-Sheet 2
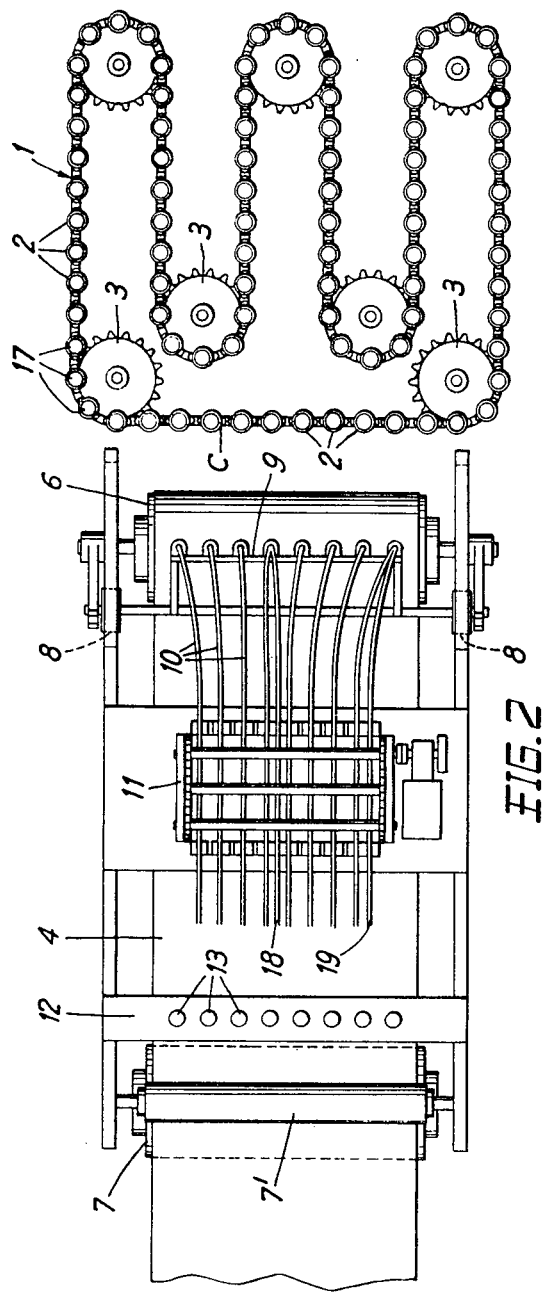
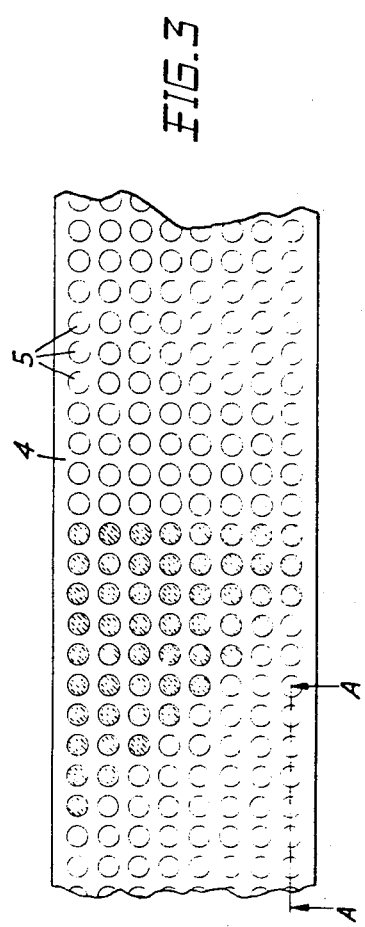

United States Patent Office 3,676,080
Patented July 11, 1972

1

3,676,080
DEVICE FOR AUTOMATICALLY ANALYZING
LIQUIDS
Roland Richterich, Bern, Switzerland, assignor to
Hoffmann-La Roche Inc., New York, N.Y.
Filed Dec. 5, 1968, Ser. No. 781,317
Claims priority, application Switzerland, Dec. 15, 1967,
17,638/67
Int. Cl. G01n 1/10, 1/18
U.S. Cl. 23—253 R                    1 Claim

ABSTRACT OF THE DISCLOSURE

Each group of reaction vessels embodied in a transparent band is automatically filled with the liquid to be analyzed and each vessel of the group is automatically filled with a different one of several reagents. Each vessel is then led past an individual light source and photocell, which latter detects the reaction and sends a signal to a chart recorder or other suitable device.

BACKGROUND OF THE INVENTION

The invention relates to a device for automatically analyzing liquids. The device has a plurality of reaction vessels, a metering arrangement for filling these vessels with predetermined quantities of different reagents and of the liquid to be analyzed, means for advancing the vessels in steps, and means responsive to the resulting reactions.

Methods and apparatuses for the qualitative and semi-quantitative analysis of liquids, such as drinking water, milk, blood, and urine, are known and used in a great number of medical and other fields. All of these methods and apparatuses thus far known have the inherent disadvantage that, on the one hand, they require considerable time and relatively well-trained personnel, and, on the other hand, they are expensive to use when analyses are continually carried out, as is necessary in large hospitals. An example is the determinations of the components of urine, which are done daily in nearly all hospitals. Each determination requires that a different portion of a urine analyzed is mixed with a given reagent, whereby after a certain lapse of time the consequent reactions, such as changes in color, enable inferences to be drawn with regard to the urine components. The different liquids required for the reactions are usually poured out by hand in carefully metered amounts, and a great deal of time is consequently required. The use of indicator papers, now quuite frequent, is not only expensive, since the paper strips can be used only once, but also limited, since the papers cannot be employed for many of the test reactions made.

There is therefore no device that quickly and automatically determines the components of liquid samples, that can be operated by untrained personnel, and that is relatively inexpensive to run.

SUMMARY OF THE INVENTION

The purpose of the present invention is to produce a device that automatically analyzes liquids and which is free of the previously enumerated disadvantages.

In accordance with the invention, the automatic device of the invention includes reaction vessels in the form of cup-like depressions in a band of transparent material. The use of transparent reaction vessels permits the use of photocells for automatically responding to the color or turbidity reactions that occur in the vessels after they are filled with the reagent and the liquid to be analyzed. In accordance with the invention, it is also possible to measure pH and electrical conductivity of the liquids automatically by immersing measuring electrodes into the filled vessels.

When making analyses in which it is desired to have a picture of the reaction, such as an agglutination, the picture can easily be recorded from below by substituting for a photocell a suitable recording apparatus, such as a camera, a photostat machine, or a coppier known under the registered trademark Xerox.

Among the analyzable liquids are biological liquids, for example, such as urine, serum, and cerebrospinal fluid. The device of the invention enables the determination in these liquids of pH, protein, glucose, ketone bodies, urobilinogen, calcium, blood, phenylpyruvic acid, bilirubin, bacteriuria, and amylase, for example. Reagents used with the device of the invention give a reaction within a definite time period with the liquids analyzed.

The device of the invention is particularly well suited to determine blood groups automatically. The picture of the reaction of the tested blood after the addition of antiserum can be recorded, as previously remarked, by light from above passing through the blood and onto a photographic instrument.

There will now be described a number of reagents and their reactions, which can be used for the usual determinations made when analyzing urine.

pH determination

A universal indicator for the pH range of 4 to 11 is made of 5 mg. thymol blue, 25 mg. methyl red, 60 mg. bromthymol blue, 60 mg. phenolphthalein, 100 ml. 75% ethanol, and 1400 ml. of distilled water, to which 0.01 normal sodium hydroxide is added to give a green color. The solution has unlimited stability at room temperature and immediately colors for at least several minutes. No difficulties arise even with very dark urines.

The colorations are evaluated as follows:

pH 4.5 red
    5   orange-red
    5.5 orange
    6   yellow
    6.5 yellow-green
    7–8 green

Protein determination

The determination is based upon the precipitation of proteins by sulphosalicylic acid, six grams of this acid being dissolved in 100 ml. of distilled water. The solution has an unlimited stability at room temperature. After this reagent is mixed with the urine the result is immediately apparent and remains constant for several minutes. Non-specific results (turbidity and flocculation) can occur after the administration of X-ray opacifying injections and certain antibiotics (penicillin, PAS) and oral antidiabetics.

The results are evaluated as follows:

0–10 mg. opalescence
10–15 mg. slight turbidity
15–20 mg. pronounced turbidity
20–25 mg. slight precipitation
more than 25 mg. pronounced precipitation

Glucose determination

This test is conducted using an enzymic method. The reagent contains glucoseoxidase, peroxidase, and chromogen. Seven hundred mg. of O-tolodinedihydrochloride, dissolved in a few ml. of water, 150 ml. 2n-acetate buffer of pH 4.1, 200 mg. glucoseoxidase, dissolved in a few ml. of water, and 15 mg. peroxidase II RZ 0.6, dissolved in a few ml. of water, are added to glycerin to make 300 ml. The reagent is stored in a dark bottle and kept at +4° C. for at least 24 hours before using. It is stable for at least a week at +4° C., and should not be kept at room temperature. The method is absolutely specific for glucose. The results are extremely time dependent.

The colorations are evaluated as follows:

100 mg. percent blue-green
250 mg. percent light blue
500 mg. percent blue
1000 mg. percent dark blue

Determination of ketone bodies

Reagent I.—Two gm. of sodium nitroferricyanide are dissolved in 100 ml. of 50% ammonium sulphate solution. The reagent is stable for two days at +4° C.

Reagent II.—25% aqueous ammonia solution. One part by volume of each of the reagents I and II is mixed with two parts by volume of urine. The intensity of the reaction increases strongly up to three minutes after mixing, and then dies away. No problems.

The colorations are evaluated as follows:

5 mg. percent rose
10 mg. percent red
20 mg. percent violet

Determination of bilirubin

Sufficient water is added to 40 mg. methylene blue to make 100 ml. The reagent has unlimited stability at room temperature. The coloration appears immediately and remains stable for several minutes.

Evaluation.—If an abnormally large amount of bilirubin is present (more than 0.7 mg. percent), the blue color turns green. This change must be very pronounced. Normal urine gives only a weak greenish cast.

Determination of urobilinogen

Two mg. p-dimethylaminobenzaldehyde are dissolved in 100 ml. 20% HCl. The solution has unlimited stability at room temperature. The coloration is stable for several minutes, but the results should be read within 30 to 60 seconds. Porphobilinogen, indole, and indoleacetic acid, as well as urobilinogen, give a rose color, indican and indoxylacetate a brown color. Fresh urine should be used for the test. Even normal urine produces no coloration, when the urine has been kept for several hours.

The coloration is evaluated as follows:

normal—rose
less than normal—colorless
more than normal—dark red

Determination of calcium

Sufficient distilled water is added to 2.5 gm. oxalic acid, 2.5 gm. ammonium oxalate, and 5.0 ml. glacial acetic acid to make 150 ml. The result is immediately apparent and is somewhat dependent on the specific gravity of the urine.

Evaluation of the test:

less than 2 mg. percent Ca—no precipitation
5 mg. percent—slight turbidity
10 mg. percent—pronounced turbidity
more than 20 mg. percent—precipitation

Determination of blood

This test depends on the evaluation of the pseudoperoxidasic action of hemoglobin with phenolphthalein.

Reagent I.—20 gm. zinc are dissolved in 200 ml. water containing 20 gm. sodium hydroxide and 1 gm. phenolphthalein, and the solution reflux boiled until the red color disappears, indicating the formation of phenolphthalein. The solution is stable for several months when stored in a dark bottle at +4° C.

Reagent II.—3% hydrogen peroxide. This solution is stable for at least one week at room temperature. The reaction is not specific for hemoglobin, which can be detected in a dilution of 1:1,000,000. White blood corpuscles present in very large numbers can also give a positive reaction, which disappears after the urine is boiled.

Depending on the amount of hemoglobin or the numbers of red corpuscles, a rose to red color is obtained.

The device of the invention is not only suitable for the analysis of biological liquids, but is equally suitable for carrying out blood tests, such as the determination of blood groups, and all other kinds of liquid analyses, such as the analysis of sewage and waste waters, of dye baths and other baths of the textile finishing industry; it is useful in the electroplating industry and in the manufacture of chemical products for industry, and in the foodstuffs industry for analyzing milk, for example. Depending on the reagent used and the reaction time, the reaction mixture can be treated in any desired manner, such as by stirring, vibrating, warming by infrared radiation, by the introduction of any desired gas, or by irradiation with ultraviolet or ionized rays, for example.

Also in dependence on the reagent and the reaction time, any desired kind of measurement, which formely was laborisously made with individual samples, can now be conducted automatically without handling the samples and without any manual assistance. Measurement can be carried out using photocells, with or without filters, or an interferometer, with light transmitted or reflected at any desired angle, or with ultraviolet or infrared rays, or using suitable measuring electrodes immersed in the reaction liquid.

The work of the assistant is limited to supplying the device with the liquid that is to be analyzed. The means for measuring the different reactions can be connected in a known manner so that its signals are continuously recorded on a chart or sent to the memory device of a computer or punched card unit.

As already remarked, when determining blood groups, for example, the reactions occurring within the cup-like depressions that serve as the reaction vessels can be recorded by any suitable device, such as a camera or a suitable photocopier, such as that known under the registered trademark Xerox.

The advantages are apparent of conducting liquid analyses completely automatically with the device of the invention. Aside from the great saving in time, in trained personnel, and in operating costs, the device, as will be explained later, gives a relatively precise, preselectable, and freely adjustable metering of the liquids, and thereby reduces uncertainty. The use of test tubes is entirely eliminated. The device is so designed that any undesired contact between the liquids used and corrodible metal parts, parts, such as mountings, is completely avoided.

BRIEF DESCRIPTION OF THE DRAWINGS

The invention will be described in detail in connection with the urine analysis, with reference to the figures of the accompanying drawings, wherein:

FIG. 1 is a side view of an embodiment of the device suitable for urine analysis;

FIG. 2 is a top view of the device shown in FIG. 1;

FIG. 3 is a top view of a preferred embodiment of the band embodying cup-like depressions that serve as the reaction vessels; and FIG. 4 is a view taken along line A—A of FIG. 3.

DESCRIPTION OF THE PREFERRED EMBODIMENTS

With reference to FIGS. 1 and 2, the feeder 1 for the liquid samples that are to be analyzed consists of an endless conveyor belt composed of flexible holders 2 set in a row. The conveyer belt passes over quide rollers 3 which are turned by a drive, not shown. A band 4 (see FIGS. 2 and 3) of transparent, plasticizer-free PVC sheet, having eight parallel rows of depressions or integral cups 5 for reaction vessels, moves from a supply roll (not shown) upwards and to the right (as viewed in FIG. 1) around a guide drum 6, which is synchronously driven by the feeder drive, and then horizontally between the guide roller 7 and its spaced pressure roller 7'. These two rollers are synchronously driven by the drive for the drum 6 and feeder 1. An eccentric 8 located above the drum 6 is also synchronously operated by the same drive. The eccentric intermittently carries out a horizontal and vertical movement, of which the one end point $a$ lies exactly above the vertex of the drum 6, and the other end point $b$ lies above the row $c$ of the holders 2 and is lower with respect to point $a$ by a vertical distance equal to the horizontal distance separating the two points. The eccentric 8 extends horizontally over the entire width of the band 4, and has an upper holder 9 to which eight synthetic plastic hoses 10 are so fixed that their outlet ends in position $a$ are exactly aligned with the centers of eight depressions 5. The holder 9 is positioned exactly above the center line of a line of depressions 5 when the latter are stationary between stepped movements. When the eccentric moves to position $b$, these same hose ends are aligned with the centers of eight holders 2 and extend about half way down into the holders. The eight hoses 10 extend parallel to a compound hose squeeze pump 11 mounted above the horizontal part of the band 4. After passing through the pump each hose leads to a respective one of eight supply vessels, not shown, containing the previously described reageants I–VIII for analyzing urine. The hose squeeze pump used is described in applicant's co-pending U.S. Pat. application Ser. No. 781,335, filed Dec. 5, 1968, for a Method for Continuously Providing Two Different Liquids in Metered Amounts. Commercially available models can also be used, provided that the hase or hoses are always squeezed for any stopped position of the pump rotor. The pump 11 is intermittently driven and reversed by means not shown. The operation of the pump will be described later. A horizontal cross bar 12 is mounted above the band 4 along its horizontal length between the guide drum 6 and the rollers 7 and 7'. The bar extends across the entire width of the band 4 and at right angles thereto. The bar carries eight light sources 13, each light source being located over a respective row of depressions 5. It has been found that the meniscal surface of the liquids in the depressions 5 scatters the light when customary light sources are used, leading to false readings when photocells measure the reactions. This problem is avoided by providing the light source with a device 20 for beaming its rays, such as a round bar of transparent material that can be glass or that known under the registered trademark Plexiglas, among other materials. In order to ensure that the lower end of the rod projects into the liquid, the band 4 can be raised at this position by guide rollers, or the cross bar 12 carrying the light sources 13 can be periodically lowered the necessary amount by an eccentric, each time that a new line of depressions 5 is brought to a stop under the bar 12. Another cross bar 14 is mounted below the band 4 and directly opposite the bar 12. The bar 14 mounts eight photocells 15, each photocell being aligned with a respective light source 13. Holders are mounted above and below the band 4 for mounting iris diaphragms and apertures for confining the beams, and color filters, in the paths of the light beams from the source 13.

The synchronous operation of the device is so designed that the feeder holders 2 are moved stepwise (in the present case counterclockwise), and the band 4 is advanced stepwise in exact synchronism with the holders 2. The operation of the eccentric 8 is so synchronised with the stepped movements that the outlet ends of the eight hoses 10, while the holders 2 and the band 4 are still between steps, project into the holders 2 in the row $c$ (see FIG. 2), remain stationary for a moment, and are raised by the eccentric and moved to position $a$, whereupon after a momentary pause the entire sequence of steps is repeated: the holders 2 and the band 4 are simultaneously advanced one step, the eight hoses are returned to position $b$ once the band 4 and the holders 2 are again still, and the hoses are brought back to position $a$ before the band and holders are again advanced. The drive for the pump 11 is exactly synchronised with these stepped movements. When the hoses are stationary in position $b$, the pump rotor is turned in that direction in which the hoses suck; the pump rotor is still while the hoses are moved from position $b$ to position $a$; and while the hoses are stationary in position $a$ the rotor is reversed, so that an amount of liquid, adjustable in dependence on the number of rotor revolutions, is expelled from the hoses. In position $a$ of the hoses, the pump rotor must be turned through a greater number of revolutions than is the case when the hoses are in position $b$, because not only must the liquid be expelled that was sucked into the hoses in position $b$ but also a corresponding volume of the reagent previously contained in the hoses. The amount of liquid sucked into the hoses in position $b$ and the amount expelled in position $a$ can be precisely regulated by the number of rotations made by the rotor in the one or the other direction. The hitherto widely used method of controlling the delivery of a pump by varying the operating time of the pump cannot be used in the present case, since it is not possible, operating the pump for predetermined time intervals, to ensure that the pump cam always comes to rest at exactly the same spot on the hose. Even very slight changes in the position at which the still cam squeezes the hose leads to changes in the amounts of liquid sucked up or expelled, thereby making precise analyses impossible. These volumetric changes increase with increasing internal diameter of the hose, when attempting to meter by operating the pump for definite time intervals.

The manner of operation of the device will now be described with reference to the continuous analysis of urine, by way of example.

Referring to FIG. 2, each hose 10 is connected to a supply vessel (not shown), which altogether contain the previously described reagents I–VIII, the uppermost hose 10 (as viewed in FIG. 2) being fed reagent I and the lowermost hose reagent VIII.

It is apparent from the earlier enumeration of the reagents that some reagents can be used, in order to carry out certain reactions, that are stable for only a limited time when completely prepared. In this case, the different parts of the solution, which themselves are stable and can be stored, are prepared, and these parts mixed together in the correct proportions shortly before use. In the present example this applies to reagents IV and VIII. In the device of the invention, these solution parts are stored in separate vessels and flow in separate hoses 18 and 19 through the pump. Each hose for the solution parts is connected as near as possible to the outlet end of the corresponding hose 10. The complete reagent, which is of limited stability, is thus formed just before it is used. Different amounts can be mixed together in any desired proportion by substituting hoses of the correct internal diameter.

Before the completely automatic word cycle is begun, the pump rotor is driven counterclockwise (as viewed in FIG. 1) until all of hoses passing through the pump 11 (here the eight hoses 10 and the two hoses 18 and 19) are filled up to their outlet ends with reagent or solution parts (and the parts mixed together in the final length of the hose). An attendant places a number of small tubes 17 in the holders 2 of the feeder 1. Each tube 17 contains a different one of the urine samples that are to be analyzed. The conveyer belt composed of the holders 2 is then placed in such a position that the tube 17 containing the first sample is positioned exactly opposite the uppermost hose 10 (as seen in FIG. 2) having the reagent I. The device is now turned on, whereupon the eccentric 8 moves to lower the uppermost hose 10 into the first tube 17—that is, into position $b$. The remaining hoses 10 holding the reagents II–VIII undergo the same movement, of course, but do not lower into any tubes 17, because no tube is located in these positions, the conveyer belt moving counterclockwise, as seen in FIG. 2. Once the tube 10 is in position $b$, it remains still until the pump rotor has turned a sufficient number of revolutions clockwise so as to suck out a predetermined quantity of urine from the first tube 17. The pump rotor is thereupon stopped and the hoses 10 moved to position $a$. When the hoses are again still, the pump rotor now turns in the reverse direction (counterclockwise) as many times, first of all, as it just did clockwise, in order to discharge all of the urine into one of the depressions 5 of the upper row (as seen in FIG. 3), and, second of all, a further number of complete turns until a predetermined volume of the reagent I held in the hose has been discharged into the same depression 5. The cup-like depression now contains both the urine sample and the required amount of universal indicator to carry out a pH color reaction. After the pump rotor has been stopped, the synchronous drive simultaneously advances the band 4 and the feeder conveyer one step. Thus, the first tube 17 is moved from opposite the uppermost hose 10 to opposite the next lower hose 10; when the aforementioned steps are repeated, a sample of the urine from the first tube 17 is mixed with the reagent II in a depression 5 located in the second row of depressions and one line of depressions behind the previously filled depression 5. The uppermost hose 10 simultaneously withdraws some urine from the next tube 17 and discharges this and a predetermined amount of the reagent I into a depression 5 of the uppermost depression row, in the same line as the depression simultaneously filled in the second depression row. After these steps have been automatically repeated eight times, the urine in the first tube 17 is mixed with each one of the reagents in a respective depression 5, each successive urine sample from the same tube 17 being shifted backwards one line of depressions with respect to the preceding sample. Once the band 4 has been advanced a sufficient number of steps, the first-filled depression 5 of the uppermost row is held stationary, between advancing steps, exactly underneath the corresponding light source 13 of the cross bar 12. The light beam passes through the liquid, the transparent band 4, and any color filter 16 that may be used onto the photocell 15, which produces an electrical output, the value of which is calibrated with respect to the color changes in the depressions 5 of this row. Each successive advancing step brings another filled depression underneath the same light source. Step-by-step, in exactly the same order as filled, successive light sources are presented with a filled depression 5 for the first time. The electrical output of each photocell therefore corresponds to the reading of a respective reaction I–VIII. The time-staggered electrical outputs for the same urine sample can be stored and later simultaneously read out; or the cross bars 12 and 14 can be angled with respect to the longitudinal axis of the band 4, so that they are parallel to the series of depressions 5 holding the same urine sample, whereby all eight color reactions of the same sample are measured during the same interval between two advancing steps.

Although the operation of the device of the invention has been explained in connection with urine analysis, it is apparent to the specialist in the art that the device is suitable for liquid analysis of any kind. The specialist will also understand that various devices and apparatuses, such as hot plates, vibrators, stirrers, radiation apparatuses, and immersion electrodes can be mounted above and below the band 4 along the horizontal path thereof between the sample filling position $a$ and the photocells 15. In accordance with the invention, both cross bars 12 and 14 can be positioned above the band 4 and each tipped so as to form a dihedral angle with the horizontal plane, whereby the photocell 15 receive reflected instead of transmitted light.

Since the inncorrect determination of blood groups often leads to serious consequences, the previously noted feature of providing a permanent pictorial record of the result of the reaction represents an important advance in the art.

Several photocells 15 and corresponding light sources 13 for each row of depressions 5 can be mounted at desired positions along the band 4 without using the cross bars 12 and 14. In this case, transmitted and/or reflected light can be used for each row. The individual light sources for each row can emit visible, infrared, or ultraviolet rays, a suitable photocell being chosen in each case.

The band 4 is manufactured from a suitable transparent polymeric synthetic plastic chosen from the many available for its suitable properties in respect of the liquids to be held in the depressions 5 and the treatment of these liquids by heating, radiation, etc. Since polymeric synthetic plastics of this kind are very cheap, the band 4 can be simply drawn from a supply roll and thrown away after one use. The band 4, however, can also be made endless and passed through a washing and drying station after the filled depressions have passed by the photocells and light sources and the reactions read off or stored.

The electrical outputs from the photocells 15 or similar transducers can be conducted in a known manner to a chart recorder, a numerical printer, a perforating machine for punched cards, or to the memory unit of a computer. In each case, the electrical outputs can be first sent to a storage device to cancel the time staggering of the outputs for a given urine sample.

When making blood group determinations using a photocopier for automatically recording the picture of the reaction, there are obtained groups of pictures, each group containing all of the reactions of a line of depressions 5. Each line of depressions can be automatically numbered, so that its number together with the reaction pictures is photographically recorded, thereby considerably increasing the documentary value of the pictures.

Although the preferred embodiments of the invention have been described, the scope of, and the breadth of protection afforded to, the invention are limited solely by the appended claim.

What is claimed is:

1. A device for automatically analyzing liquids comprising:

first feed means for conveying a plurality of individually removable containers in column-like formation along a first path in a first direction each container adapted to contain a solution to be analyzed, flexible, transparent band means having a series of parallel rows of depressions constituting a plurality of vessels defining integral portions of the band, metering means driven in synchronism with said feed means for filling said vessels with predetermined quantities of each the solution to be analyzed and a reagent, second feed means for advancing said rows of vessels in steps in a second direction perpendicular to said first direction and for driving said band means in synchronism with said first feed means and metering means, whereby successive rows of said vessels are advanced to a position in parallel with and adjacent to said first path, and detector means including a light source and photocell means for each one in a pre-selected row of said vessels, enabling a separate light beam to pass through each of said vessels to detect a reaction in the vessel.

References Cited

UNITED STATES PATENTS

| | | | |
|---|---|---|---|
| 3,536,449 | 10/1970 | Astle | 23—253 X |
| 3,193,359 | 7/1965 | Baruch et al. | 23—253 X |
| 3,260,413 | 7/1966 | Natelson | 23—259 X |
| 3,327,535 | 6/1967 | Sequeira | 23—259 X |
| 3,480,398 | 11/1969 | Hamilton | 23—253 |
| 3,489,525 | 1/1970 | Natelson | 23—259 X |
| 3,432,271 | 3/1969 | Wasilewski | 23—259 X |
| 3,441,383 | 4/1969 | Moore et al. | 23—259 X |
| 3,475,130 | 10/1969 | Baruch | 23—259 X |
| 3,481,709 | 12/1969 | Slone | 23—259 X |
| 3,526,480 | 9/1970 | Findl et al. | 23—253 |
| 3,261,668 | 6/1966 | Natelson | 23—253 TP |
| 3,497,320 | 2/1970 | Blackburn et al. | 23—253 |
| 3,504,376 | 3/1970 | Bednar et al. | 23—253 |
| 3,508,879 | 4/1970 | Findl et al. | 23—259 X |

JOSEPH SCOVRONEK, Primary Examiner

R. E. SERWIN, Assistant Examiner

U.S. Cl. X.R.

23—259 R; 73—425.4; 141—130

PO-1050
(5/69)

UNITED STATES PATENT OFFICE
CERTIFICATE OF CORRECTION

Patent No. __3,676,080__ Dated __July 11, 1972__

Inventor(s) __Roland Richterich__

It is certified that error appears in the above-identified patent and that said Letters Patent are hereby corrected as shown below:

Please correct location of Assignee to read Nutley, New Jersey instead of New York, N.Y.

Signed and sealed this 2nd day of January 1973.

(SEAL)
Attest:

EDWARD M. FLETCHER, JR.
Attesting Officer

ROBERT GOTTSCHALK
Commissioner of Patents